United States Patent [19]
Foladare et al.

[11] Patent Number: 5,978,671
[45] Date of Patent: *Nov. 2, 1999

[54] METHOD FOR UPDATING A CALLER DATABASE IN A COMMUNICATION SYSTEM

[75] Inventors: Mark Jeffrey Foladare, Kendall Park; Shelley B. Goldman, East Brunswick; David Phillip Silverman, Somerville, all of N.J.

[73] Assignee: AT&T Middletown, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/576,387

[22] Filed: Dec. 21, 1995

[51] Int. Cl.⁶ .................................................... H04Q 7/20
[52] U.S. Cl. ........................................ 455/412; 455/461
[58] Field of Search ............................... 379/58, 59, 111, 379/113, 114, 130, 133, 139, 140, 142, 57

[56] References Cited

U.S. PATENT DOCUMENTS

| | | | |
|---|---|---|---|
| 4,928,302 | 5/1990 | Kaneuchi et al. | 379/354 |
| 5,398,279 | 3/1995 | Frain | 455/31.2 |
| 5,524,140 | 6/1996 | Klausner et al. | 455/566 |
| 5,592,531 | 1/1997 | Cheng et al. | 379/58 |

FOREIGN PATENT DOCUMENTS 503813   9/1992   United Kingdom ..................... 379/59

*Primary Examiner*—Dwayne D. Bost
*Assistant Examiner*—Myron K. Wyche

[57] ABSTRACT

A method for updating a caller database in a communication system by detecting repeat callers during the bridging of calls placed to a called party subscriber and upon such detection, enabling the subscriber to enter corresponding alphanumeric identifiers in the frequent caller database. This method is useful in a communication system that completes a telephone call placed by a caller to a personal telephone number of a called party by bridging that call to a return call originated by the called party in response to a paging signal alerting the subscriber of the telephone call.

32 Claims, 2 Drawing Sheets

METHOD FOR UPDATING A CALLER DATABASE IN A COMMUNICATION SYSTEM

CROSS-REFERENCE TO RELATED CASES

This application is related to commonly assigned pending U.S. patent application Ser. Nos. 08/424,825 and 08/497,060 filed Apr. 19, 1995, and Jun. 30, 1995, respectively, which are both incorporated by reference herein.

FIELD OF THE INVENTION

The invention relates to personal communications and more particularly, to systems for establishing communications between a caller and a called party using call bridging.

BACKGROUND OF THE INVENTION

A problem with setting up telecommunication connections today is the difficulty of contacting called individuals who are highly mobile. In general, persons wishing to contact a particular party initiate a call to a specific telephone associated with that party such as the party's home telephone. However, a disadvantage of this method of communication is that parties are not always in close proximity to their home telephone. Several technologies have developed in an effort to solve the problem of establishing communication with a mobile party. These include call forwarding, paging and cellular systems. However, each of these systems has their own drawbacks which inhibit seamless communication.

A communication system that enable real time call connection to a mobile subscriber establish communications using a combination of paging and call bridging. In these systems, a caller places a telephone call to a called party subscriber's personal telephone number which is routed to a bridging and signaling unit having an associated database. Information stored in the database is then used to initiate transmission of a paging signal to the pager of the subscriber. The bridging and signaling unit is arranged to hold the connection to the calling party for a predetermined period after the paging signal is transmitted. The called party subscriber, upon being alerted by his pager, can initiate a call from a nearby telephone to the bridging and signaling unit which bridges the calling and called party calls together.

In such systems, it is possible to transmit in the paging signal a subscriber defined alphanumeric identifier that represents known calling parties such as repeat or frequent callers. For instance, an alphanumeric identifier "DAD" can be used to identify when a subscriber's father is calling. Such an identifier would correspondingly be displayed on the called party's pager and alert the subscriber as to the identity of the calling party. These subscriber defined identifiers are often maintained in the database associated with the bridging and signaling unit. The alphanumeric identifiers in the database are typically cross-referenced with the automatic number identification (ANI's) of the calling parties' telephone or personal identifier numbers (PIN's) given to the calling party's by the subscriber.

Typically, a subscriber enters the alphanumeric identifiers in the database in a separate off-line procedure other than receiving a call. This procedure must be repeated periodically as new callers are regarded by the subscriber as frequent or repeat callers. This procedure can be inconvenient to some subscribers. Moreover, a subscriber must remember or record the required ANI's or PIN's that are to be used in entering the corresponding identifiers. As a result, some subscribers may not take full advantage of the ability to define and receive identifiers for frequent or repeat callers.

Further, the use of PIN's are required in accordance with conventional systems in order for a caller to be identified by the system independent of the telephone he used to place the call. However, in addition to the requirement that subscribers have to remember the assigned PIN's for entry during the off-line process, the corresponding caller would have to remember or carry a record of the assigned PIN for use each time he calls the subscriber.

Thus, a need exists for a more convenient and efficient process for entering alphanumeric identifiers in a communication system for frequent or repeat callers.

SUMMARY OF THE INVENTION

The invention concerns a method for updating a caller database in a communication system by detecting repeat callers during the bridging of a call placed to a called party subscriber and upon such detection, enabling the subscriber to enter an alphanumeric identifier in the caller database. This method is useful in a communication system that bridges a telephone call placed by a caller to a subscriber's telephone number to a return call originated by the subscriber in response to receiving a message alerting him of the telephone call.

In accordance with the invention, upon receiving a call to a subscribers' telephone number, the system determines if an alphanumeric identifier for the calling party is present in the caller database. If such an identifier is present then the subscriber is transmitted a message, such as by paging, with the identifier and then the call is completed in the usual manner. However, if no alphanumeric identifier exists in the database, the system alerts the subscriber with a message indicating that a caller is calling and that no alphanumeric identifier has been defined. The subscriber places the return call and upon termination of the call, the system enables the called party to enter an alphanumeric identifier in the caller database for that calling party.

This database update method enables a subscriber to conveniently update the caller database during the bridging of a call instead of using a more time consuming off-line process which would have to be performed periodically to add new frequent or repeat callers as they occur. Further, the invention provides a convenience to subscribers as they no longer need to remember or record ANI or PIN information or engage in a separate off-line process in storing the identifiers.

In accordance with this method, it is possible to enable the subscriber to enter an identifier once a caller has called a particular threshold number of times. For instance, if a threshold value of two were used, the first time a particular caller calls, the subscriber would be alerted that a new caller is calling and the second time the caller calls, the subscriber would be alerted that a repeat caller is calling and given the option of entering a corresponding identifier. It is further possible for the threshold value to be set by the subscriber.

In one embodiment, the system prompts a caller to speak a word or phrase such as his name and speech recognition techniques are used to obtain characteristic features of the caller's speech which can be used as caller identity information for querying the caller database. In this manner, the system is able to identify a caller independent of the calling telephone ANI that was used to place the call. The ANI of the calling telephone can still be used as supplemental information in identifying a repeat caller. Further, the use of caller identity information based on the caller's speech characteristics enables the system to provide the option of a suggested alphanumeric identifier that was generated using speech-to-text techniques on a caller's spoken name.

It is possible to provide enhanced recognition of a repeat caller by maintaining several audible identifiers for the repeat caller in the database. The audible identifiers can be obtained using a novel and unobvious method in accordance with another embodiment of the invention. In such an embodiment, the subscriber is given the opportunity to listen to those caller audible identifiers that are determined to originate from possible repeat callers as well as the corresponding stored audible identifier, and determine if they are from the same caller. If the subscriber indicates that the audible identifiers originated from the same caller, then both audible identifiers are stored with the corresponding entered alphanumeric identifier. Otherwise, the caller's audible identifier is stored for identifying future repeat callers. This method obtains audible identifier samples that can be used to enable the system to learn or adapt to the possible variations in a repeat callers voice to provide enhanced identification of repeat callers.

Additional features and advantages of the present invention will become more readily apparent from the following detailed description and accompanying drawings.

BRIEF DESCRIPTION OF THE DRAWINGS

FIG. 3 illustrates a flow diagram of an exemplary modification to the method in FIG. 2 for enhanced recognition of repeat callers.

DETAILED DESCRIPTION

The invention is based on a unique and unobvious approach in a communication system of enabling a called party subscriber to enter an alphanumeric identifier associated with a respective caller during the bridging of a corresponding telephone call. The alphanumeric identifier can then be used in alerting the subscriber of the caller's identity the next time the caller calls. In accordance with this approach, during the bridging of a call by a caller to the subscriber, the system detects if the caller has a corresponding alphanumeric identifier in a database associated with the system, and then alerts the subscriber when a corresponding identifiers does not exist in the database and permits the subscriber to update the database, such as at the termination of the call. This method is useful in a communication system that bridges a telephone call placed by a caller to a subscriber's personal telephone number with a return call originated by the subscriber in response to the subscriber receiving a pager message of the telephone call.

Figure 1:
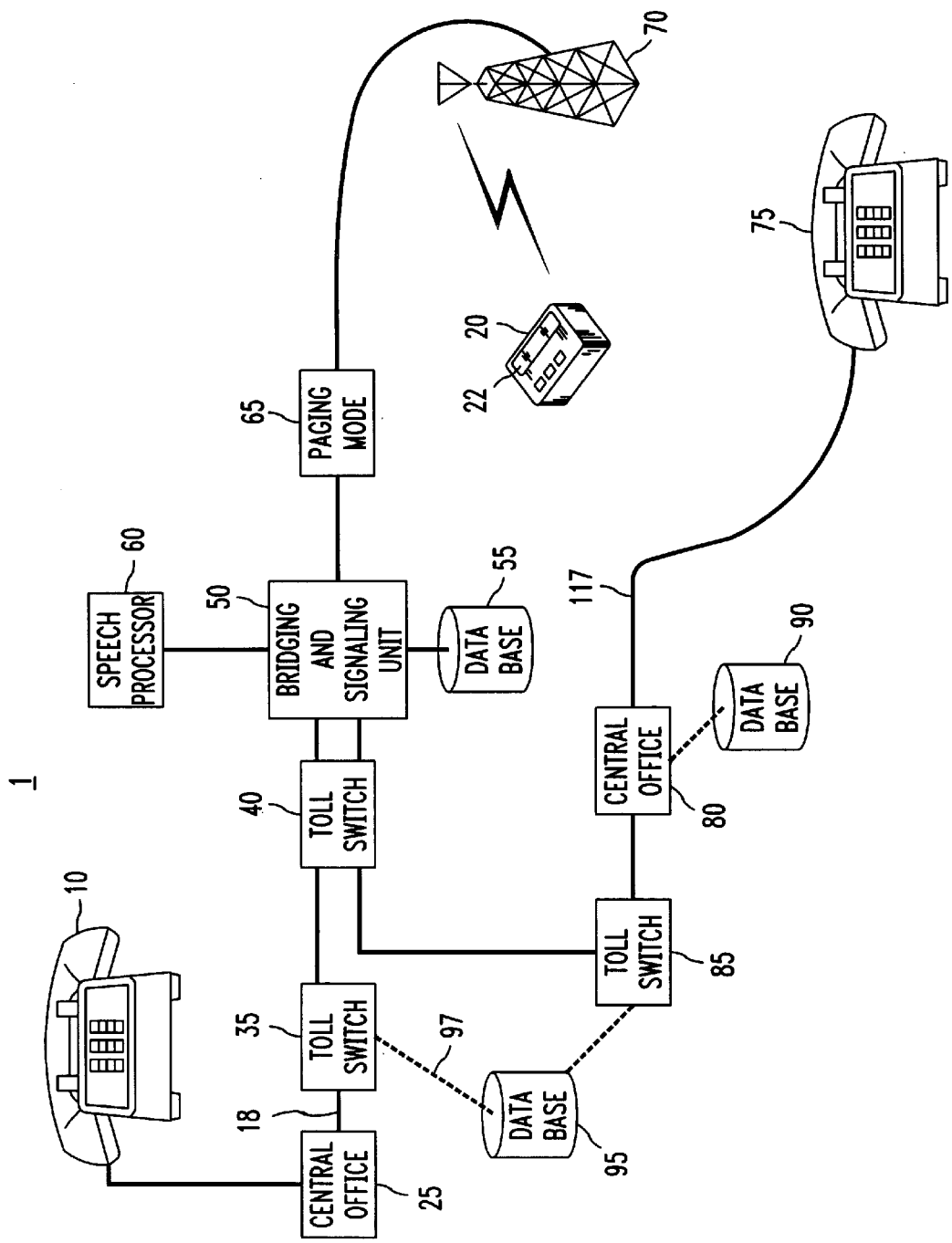
FIG. 1 illustrates a schematic block diagram of an exemplary communication system that employs a caller database update method in accordance with the present invention.

An exemplary communication system 1 that stores subscriber defined alphanumeric identifiers in accordance with the invention is shown in FIG. 1. In FIG. 1, a caller places a call from a calling station such as telephone 10 to a telephone number a subscriber associated with pager 20, such as a personal telephone number. It is alternatively possible to initiate the call through dialing a special access code that associated with a service that performs the method of the invention.

The caller's telephone call is passed to a central office 25 of a local exchange carrier. The central office 25 routes the call to toll switch 35 via trunk 18. It is possible to use an equal access facility such as a Feature Group D trunk for the trunk 18. Information of the telephone number associated with the calling telephone 10 can also be provided to toll switch 35 by use of an automatic number identification (ANI) which is a feature presently available through Feature Group D trunks. Suitable switches for the toll switch 35 include an AT&T 4ESS electronic switching system described in, for example, *Bell System Technical Journal*, Vol. 56, No. 7, pp. 1015–1030 (September 1977).

The toll switch 35 then routes the call and ANI information, if available, to toll switch 40 which routes it to bridging and signaling unit 50. It is possible to perform the above described routing from the calling telephone 10 to the bridging and signaling unit 50 in a substantially similar manner that is used for routing conventional or wireless telephone calls. The bridging and signaling unit 50 performs the function of connecting at least one group of two incoming telephone calls to each other. The bridging and signaling unit 50 can advantageously be implemented in a Conversant® Voice Information System Release R1 V2.1 manufactured by AT&T Corp.

Upon receipt of a call, the bridging and signaling unit 50 queries an associated database 55, which contains paging information including a code that identifies the called party subscriber's pager 20. The proper code for the pager 20 can be determined because the subscriber's pager 20 is also associated with the called personal telephone number. This code can also be stored within the pager 20. The database 55 can also contain characteristic information regarding frequent callers and an alphanumeric identifier selected by the subscriber to represent a corresponding frequent caller. It is possible for the database 55 to be a general purpose data processor such as an AT&T 3B-20 processor configured as described in U.S. Pat. No. 4,191,860, assigned to the assignee of the present application and incorporated by reference herein.

The bridging and signaling unit 50 determines if the caller has an associated alphanumeric identifier stored in the database 55 from identity information obtained from the caller upon receipt or during the telephone call. It is possible for the such identity information to include, for example, the associated ANI information, an entered personal identification number (PIN) given to the caller by the subscriber and characteristic features of a spoken word or phrase of the caller determined, for example, by an optional speech processor 60, as is described in greater detail below. Accordingly, if an alphanumeric identifier is contained in the database for the caller then the bridging and signaling unit 50 forwards the identifier as well as the paging information to a paging node 65. Otherwise, the bridging and signaling unit 50 can forward the ANI information or a PIN in addition to the paging information to the paging node 65.

The paging node 65 can be a satellite paging facility of the type operated by numerous paging service providers such as Skytel (TM), that are equipped to transmit a paging signal to receivers located within a desired geographic area. The paging node 65 then broadcasts a paging signal containing the paging information as well as received other information concerning the caller from a paging tower 70. The pager 20 receives the transmitted paging signal. If the code in the paging information matches the code stored in the pager 20 then the pager 20 alerts the subscriber and displays the received caller information such as the alphanumeric identifier or the caller's ANI or PIN information on the corresponding display 22. The use of pager 20, pager node 65 and paging tower 70 is for transmitting a message to the subscriber in order to alert him of the incoming call and is not meant to be a limitation of the invention. Other messaging devices can be used to alert the subscriber of the incoming including, for example, a personal digital assistant (PDA).

In response to the alerting by the pager 20, the subscriber can originate a return telephone call from any telephone such as the telephone 75 to a particular telephone number. Such a return telephone call can automatically be placed if the pager 20 and telephone 75 are incorporated into a single unit. A central office 80 receives the return call and routes it to the bridging and signaling unit 50 via the toll switches 85 and 40. Upon receipt of the return call at the bridging and signaling unit 50, the caller's call and the return telephone call are bridged or connected together so that the calling and called parties can communicate.

It is possible for the telephone number of the return telephone call to be translatable including 500-, 700-, 800-, or 900-type of telephone numbers such that a query of database 90 associated with the central office 80 and database 95 associated with the toll switch 85 can be performed to determine the routing inter-exchange carrier and the telephone number to which the call is actually completed. An advantage of using a translatable telephone number is that it enables the subscriber to place a return call without having any information about the area code of the telephone line which is using. In addition, the subscriber's telephone number can also be a translatable number as shown by dashed connection 97 of the database 95 to the toll switch 35.

Figure 2:
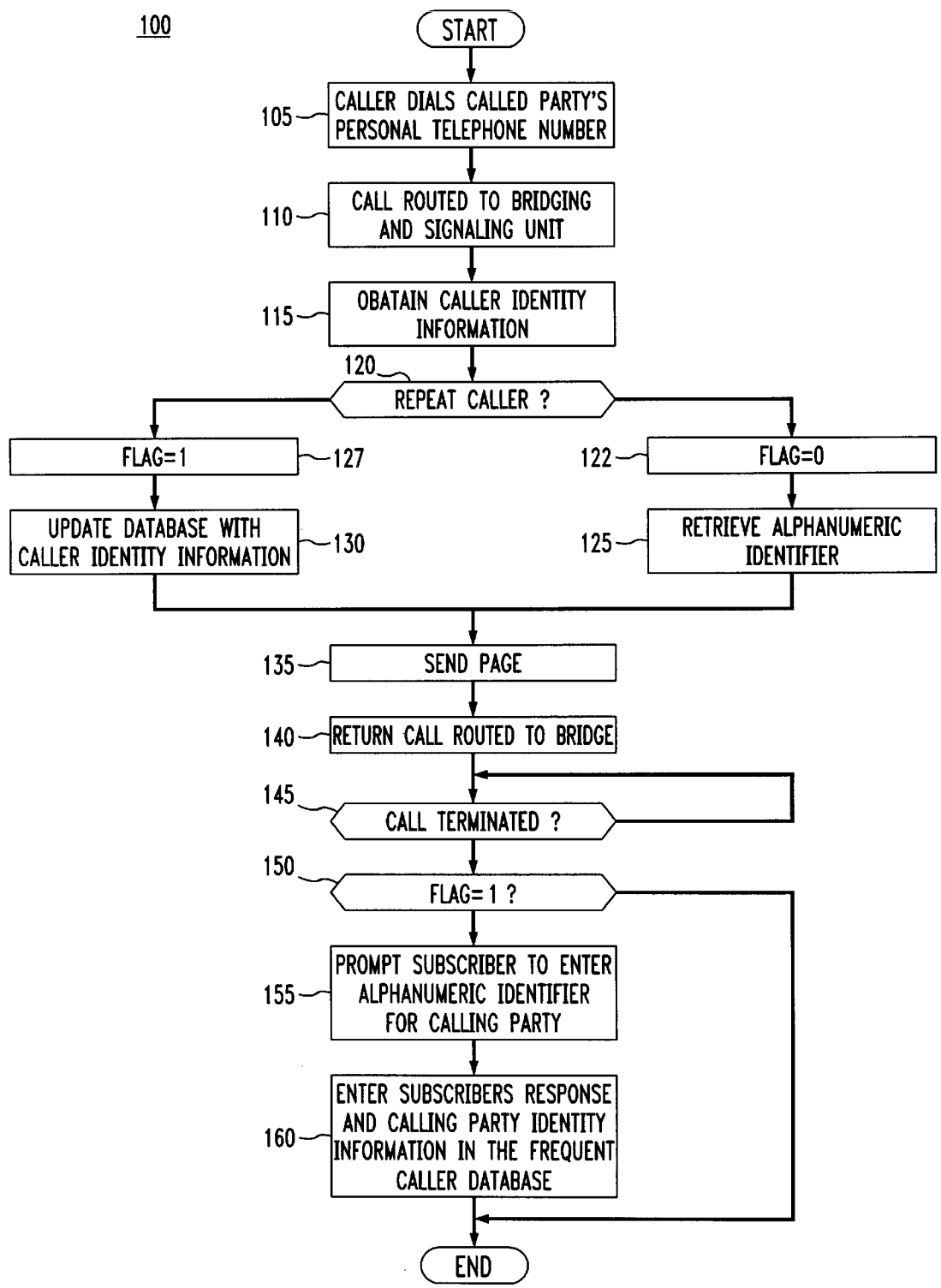
FIG. 2 illustrates a flow diagram of an exemplary database update method used in the system of FIG. 1.

The present invention is directed to convenient methods for adding alphanumeric 30 identifiers associated with frequent or repeat callers to the database 55 during the bridging of calls without requiring the subscriber to enter such names in a separate off-line process. An exemplary method 100 in accordance with the present invention is shown in FIG. 2. It is possible for such a method to be performed by the bridging and signaling unit 50. The method 100 of FIG. 2 will be described with respect to the system 1 of FIG. 1.

In accordance with the method 100, in step 105, a caller dials a called party's telephone number using the calling telephone 10, shown in FIG. 1. Then, in step 110, the call is routed to the bridging and signaling unit 50, also shown in FIG. 1, as is previously described with respect to FIG. 1. Upon receipt of the call, the bridging and signaling unit 50 obtains the caller identity information in step 115. The caller identity information can include the ANI information of the caller, a PIN entered in response to a prompt by the bridging and signaling unit 50, characteristic features of a caller's spoken word or phrase, or any combination of such information.

The caller identity information is then used to query the database 55 associated with the bridging and signaling unit 50 to determine if the caller is a repeat caller in step 120. If an alphanumeric identifier corresponding to the caller is found then a flag FLAG is set to a value 0 and the identifier are retrieved in steps 122 and 125. Then, in step 135, a page is sent to the called party subscriber with the alphanumeric identifier to alert him of the identity of the repeat caller.

However, if no alphanumeric identifier is found in step 120 then the flag FLAG is set to a value 1, in step 127, and the caller identity information is stored in the database 55 in step 130. A page signal is then sent in step 135 to alert the called party subscriber that a new caller is calling. It is possible for the page signal to also include the ANI information for the new caller. It should be readily understood that the value used for the flag FLAG is not critical to the present invention. The use of the values 0 and 1 for the flag FLAG is to indicate a status of whether or not an alphanumeric identifier is contained in the database 55 and any value or technique can be used for providing such an indication.

Then, after the called party subscriber receives the page the subscriber places a return call to the bridging and signaling unit 50, in step 140, and the caller's call and called party's return call are bridged to enable the two parties to communicate. The method 100 then waits until the call has terminated in step 145 before proceeding to step 150. In step 150, the value FLAG is tested and if equal to zero then an alphanumeric identifier was present in the database 55 for the caller and the method 100 ends. However, if in step 150 the value FLAG is not equal to zero then no alphanumeric identifier exists for the caller and method 100 proceeds to step 155. In step 155, if the subscriber remains on the telephone line after the termination of the call then he is prompted to enter an alphanumeric identifier for the caller for which communication has just been terminated. The subscriber would have known to stay on the telephone line to enter the identifier because the paging signal contained an indication that the caller is a new caller without an associated identifier.

The subscriber can then enter the alphanumeric identifier in a variety of ways using the telephone keypad or by speaking the words or individual letters to be used if a voice recognizer such as a speaker independent voice recognizer is associated with the bridging and signaling unit 50. Such a voice recognizer is disclosed in U.S. Pat. No. Re. 32,012, which is assigned to the assignee of the present invention and incorporated by reference herein. The response for the alphanumeric identifier entered by the subscriber is then stored in the database 55, in step 160, and the method 100 ends.

The previously described method with respect to FIG. 2 would prompt a subscriber for entry of an alphanumeric identifier each time a new caller is detected and is for illustration purposes only. However, the method 100 can also be used to prompt the subscriber to enter an alphanumeric identifier after any threshold number of times a particular caller has called. For example, a value indicating the number of times a particular caller has called can be maintained in the database 55 and cross-referenced with the caller identity information that was stored in step 130. Then, the method would perform the steps 155 and 160 only after that value has reached the particular threshold number of repeat calls. This repeat call limit can be fixed by the system or set by the subscriber. Moreover, in such a system, the status of a caller as a new or repeat caller can also be included in the paging information to better inform the subscriber.

It is possible to employ an audible identifier for the caller identity information to better identify the caller to the bridging and signaling unit 50. Suitable audible identifiers include, for example, characteristic features of the caller's voice or tones generated with the calling telephone's keypad, individually or in combination. As a result of such audible identifiers, a caller can be identified as a repeat caller even if he uses different telephones to call the subscriber. For instance, in obtaining the caller identity information in step 115 of FIG. 2, the caller can be prompted to speak a word or phrase such as the caller's name. The caller's response can then be processed by the speech processor 60, shown in FIG. 1, to identify particular characteristic features that would likely be detected during subsequent telephone calls. An exemplary apparatus and method for identifying such characteristic features is disclosed in, for example, U.S. Pat.

No. 4,665,548, assigned to the assignee of the present invention and incorporated by reference herein.

Moreover, the recited name of the caller in such a system can be used to construct an alphanumeric identifier using a speech-to-text technique. Accordingly, when the subscriber is prompted to enter an alphanumeric identifier for a repeat caller such a prompt can contain a suggested alphanumeric identifier that was generated from the calling parties speech. Thus, entry of the alphanumeric identifier by the subscriber can include a verification of the suggested identifier. Suitable speech-to-text methods include, for example, those disclosed in U.S. Pat. No. 5,146,405, assigned to the assignee of the present invention and incorporated by reference herein.

The method 100 of FIG. 2 describes an embodiment of the invention in which alphanumeric identifiers are added after the communications have ceased during the bridging of a call while the subscriber remains on the telephone line. Other suitable methods for entering the alphanumeric identifiers during the bridging of a call in accordance with the invention include, for example, the use of a alphanumeric entry two-way paging device that enables the subscriber to enter the alphanumeric identifier via the paging network during or after the bridging of a call. Exemplary alphanumeric two-way paging devices include two-way pagers coupled to or contained in PDA's. Such an embodiment would advantageously reduce the time of the bridged call since the subscriber does not have to remain on the telephone line after the caller has terminated communications. As a result, the cost of the bridged call would be reduced.

A modification 200 to method 100 that provides enhanced recognition of repeat callers is shown in FIG. 3. The modified process 200 includes steps that are performed between steps 120 and 127 of method 100 of FIG. 2. The process 200 concerns the processing of audible identifiers entered by a caller. The process 200 attempts to match caller's audible identifiers with audible identifiers previously entered in the database 55 to identify possible repeat callers. The subscriber is given the opportunity to listen to those caller audible identifiers that are determined to originate from possible repeat callers as well as the corresponding stored audible identifier, and determine if they are from the same caller. If the subscriber indicates that the audible identifiers originated from the same caller, then both audible identifiers are stored with the corresponding entered alphanumeric identifier. Otherwise, the caller's audible identifier is stored for identifying future repeat callers. This method obtains audible identifier samples that can be used to enable the system to learn or adapt to the possible variations in a repeat callers voice to provide enhanced the identification of repeat callers.

A process in accordance with this embodiment of the invention would proceed from step 120 of the method 100 in FIG. 2 to step 210 of the process 200 in FIG. 3. In step 210 the process 200 determines if at least one characteristic features of an audible identifier entered by a caller is within a threshold range or variance of such a feature of a stored audible identifier in the database 55 entered by a previous caller. If the process 200 finds that the audible identifier is not within a threshold limit of stored audible identifiers then the process proceeds to step 127 in the method 100 of FIG. 2 to continue processing as is previously described. However, if the characteristic features of the caller's audible identifier is within a threshold limit or variance of a previously stored audible identifier then the process 200 proceeds to step 220 in FIG. 3.

In step 220, the subscriber is paged with a message identifying that a possible repeat caller is calling. The message can also include ANI information to better alert the called party as to the identity of the caller. Then, in step 230, the subscriber's return call is routed to the bridging and signaling unit 50. The process 200 then waits for the completion of the caller's call in step 240.

After termination of the caller's call in step 240, the process 200 enables the subscriber to remain on the telephone line and listen to the caller's audible identifier and the previously stored audible identifier, in step 250, to determine if they are the same caller. The subscriber is then prompted, in step 260, to reply whether the audible identifiers were generated by the same caller and his response is detected in step 270. If the subscriber's reply is that the audible identifiers are not associated with the same caller then the process 200 proceeds to step 280 where the audible identifier is stored for future comparisons.

However, if the subscriber replies that the audible identifiers originated from the same caller in step 270 then the process 200 proceeds to step 290 where the subscriber is prompted to enter an alphanumeric identifier corresponding to the caller's audible identifier, as well as the previously stored audible identifier if no alphanumeric identifier is associated with it. Then, in step 295, the subscriber's reply is entered in the database 55 with associated caller identity information for each of the audible identifiers. In this manner, numerous audible samples can be obtained and maintained in the database 55 for a repeat caller with the corresponding alphanumeric identifier to better identify the repeat caller at a later time.

It is possible for the method 200 to attempt to match caller's audible identifiers with audible identifiers entered by previously callers that are associated with alphanumeric identifiers and/or those stored audible identifiers that are not associated with alphanumeric identifiers. If the caller's audible identifier is matched with one having an associated alphanumeric identifier then the subscriber can be given the option to also associate that alphanumeric identifier with the caller's entered audible identifier. Alternatively, if the caller's audible identifier is matched with one having no associated alphanumeric identifier then the alphanumeric identifier entered by the subscriber can be associated with both audible identifiers in the database 55.

With regard to comparisons with previously entered audible identifiers that are not associated with alphanumeric identifiers, although the method 200 is described for prompting the subscriber after a second call, the system can be set to prompt the subscriber after a greater number of calls from a possible repeat caller. The number of calls by a possible repeat caller that would cause prompting of the subscriber can be fixed in the system or set by the called party subscriber. In an alternative embodiment, the caller can be prompted to enter his audible identifier numerous times during the bridging of a call to obtain the desired number of audible identifier samples.

The database update methods of this invention provide a substantial convenience to users in adding identifiers for repeat callers without requiring users to remember ANI or PIN information or rely on a separate off-line entry process. In addition, if characteristic features of the caller's speech are used for the caller identity information then the caller can be identified as a repeat caller independent of the telephone he uses to place the call.

Although several embodiments of the invention have been described in detail above, many modifications can be made without departing from the teaching thereof. All of such modifications are intended to be encompassed within the following claims. For instance, although the invention has been described using a single database associated with the bridging and signaling unit, it is possible to use several databases to cross-reference the subscriber's telephone number and pager codes as well as the caller identity information and corresponding alphanumeric identifiers. Further, this convenient method of updating alphanumeric identifiers can be advantageously implemented in conjunction with conventional off-line methods for providing such updates.

The invention claimed is:

1. A method for bridging a call placed by a caller to a telephone number of a called party, said call being bridged to a return call originated by said called party in response to being transmitted a message of said call, the method comprising the steps of:
   determining based on a caller identity information associated with the caller whether a corresponding alphanumeric identifier exists in a database;
   transmitting a message to said called party containing said alphanumeric identifier if said identifier exists in said database for said caller; and
   if no alphanumeric identifier exists in said database for said caller,
   transmitting a message to said called party that a caller is calling that has no corresponding identifier in said database, and
      enabling said called party, during said call, to enter an alphanumeric identifier in said database for said caller.

2. The method of claim 1 wherein the step of enabling said called party to enter an alphanumeric identifier is performed upon termination of the caller's call.

3. The method of claim 1 wherein the step of transmitting a message to said called party comprises the step of paging said called party with a paging signal containing said message.

4. The method of claim 1 further comprising determining based on said caller identity information whether said caller had previously called said called party a threshold number of times by querying said database, wherein the step of enabling said called party to enter an alphanumeric identifier in the said database is performed after the caller has called the threshold number of times.

5. The method of claim 4 wherein said threshold number of times is at least once.

6. The method of claim 4 wherein said threshold number is set by said called party.

7. The method of claim 1 wherein said called party enters said alphanumeric identifier while said bridged call is in progress.

8. The method of claim 7 wherein the step of enabling said called party to enter said alphanumeric identifier further comprises entry of said identifier by said called party over a messaging network.

9. The method of claim 8 wherein said messaging network is a paging network.

10. The method of claim 1 further comprising:
    transmitting a message to said called party that a new caller is calling if it is determined that the caller had not previously called said called party; and
    updating the caller database with said caller identity information associated with said caller.

11. The method of claim 1 further comprising:
    prompting said caller to provide an audible identifier; and
    detecting characteristic features of a response audible identifier, wherein said caller identity information corresponds to said detected characteristic features.

12. The method of claim 11 further comprising generating alphanumeric information based on the characteristic features, wherein the step of enabling said called party to establish an alphanumeric identifier in the frequent caller database for said caller includes receiving verification by the called party to use the generated alphanumeric information as the alphanumeric identifier.

13. The method of claim 11 further comprising:
    identifying caller identity information in the database for previous callers with no associated alphanumeric identifier having a characteristic feature substantially within a threshold limit of the detected characteristic feature of the caller's audible identifier;
    if caller identity information is identified,
       transmitting a message to said called party that a possible repeat caller is calling;
       enabling the called party to listen to said audio identifiers of the caller and of said previous caller associated with the identified caller identity information;
       prompting the called party to determine if the caller and the previous caller are the same person; and
       if the called party responds that the caller and the previous caller are the same party, enabling the called party to enter said alphanumeric identifier in the database.

14. The method of claim 13 further comprising storing the caller identity information associated with said response audible identifier, wherein the alphanumeric identifier is associated with the identified caller identity information as well as said caller identity information associated with said response audible identifier.

15. The method of claim 13 further comprising transmitting said audible identifier of said caller to the database.

16. The method of claim 1 further comprising:
    transmitting a message to said called party that a new caller is calling if it is determined that the caller had not previously called said called party; and
    updating the caller database with the caller identifier information.

17. A method for bridging a call placed by a caller to a telephone number of a called party, said call being bridged to a return call originated by said called party in response to being transmitted a message of said call, the method comprising the steps of:
    determining based on caller identity information associated with the caller whether an alphanumeric identifier exists in a database;
    transmitting a message to said called party containing said alphanumeric identifier if said identifier exists in said database for said caller; and
    if no alphanumeric identifier exists in said database for said caller,
       determining based on the caller identity information whether said caller had previously called said called party by querying said database,
       transmitting a message to said called party that a repeat caller is calling, and
       enabling said called party, during said call, to enter an alphanumeric identifier in said database for said caller.

18. The method of claim 17 wherein the step of enabling said called party to enter an alphanumeric identifier is performed upon termination of the caller's call.

19. The method of claim 17 wherein the step of transmitting a message to said called party comprises the step of paging said called party with a paging signal containing said message.

20. The method of claim 17 wherein said called party enters said alphanumeric identifier while said bridged call is in progress.

21. The method of claim 20 wherein the step of enabling said called party to enter said alphanumeric identifier further comprises entry of said identifier by said called party over a messaging network.

22. The method of claim 21 wherein said messaging network is a paging network.

23. The method of claim 17 further comprising:
transmitting a message to said called party that a new caller is calling if it is determined that the caller had not previously called said called party; and
updating the previous caller database with said caller identity information associated with said caller.

24. The method of claim 17 further comprising:
prompting said caller to provide an audible identifier; and
detecting characteristic features of a response audible identifier, wherein said caller identity information corresponds to said detected characteristic features.

25. The method of claim 24 further comprising generating alphanumeric information based on said characteristic features, wherein the step of enabling said called party to establish an alphanumeric identifier in the frequent caller database includes receiving verification by the called party to use the generated alphanumeric information as the alphanumeric identifier.

26. The method of claim 25 wherein said caller identity information further includes information concerning the identity of a calling station used by said caller.

27. A method for bridging a call placed by a caller to a telephone number of a called party, said call being bridged to a return call orginated by said called party in response to being transmitted a message of said call, the method comprising the steps of:
determining based on a caller identity information associated with the caller whether a corresponding alphanumeric identifier exists in a database;
transmitting a message to said called party containing said alphanumeric identifier if said identifier exists in said database for said caller;
if no alphanumeric identifier exists in said database for said caller,
transmitting a message to said called party that a caller is calling that has no corresponding identifier in said database, and
enabling said called party to enter an alphanumeric identifier in said database for said caller;
prompting said caller to provide an, audible identifier;
detecting characteristic features of a response audible identifier, wherein said caller identity information corresponds to said detected characteristic features;
identifying caller identity information in the database for previous callers with no associated alphanumeric identifier having a characteristic feature substantially within a threshold limit of the detected characteristic feature of the caller's audible identifier;
if caller identity information is identified,
transmitting a message to said called party that a possible repeat caller is calling;
enabling the called party to listen to said audio identifiers of the caller and of said previous caller associated with the identified caller identity information;
prompting the called party to determine if the caller and the previous caller are the same person; and
if the called party responds that the caller and the previous caller are the same party, enabling the called party to enter said alphanumeric identifier in the database.

28. The method of claim 27 further comprising storing the caller identity information associated with said response audible identifier, wherein the alphanumeric identifier is associated with the identified caller identity information as well as said caller identity information associated with said response audible identifier.

29. The method of claim 27 further comprising transmitting said audible identifier of said caller to the database.

30. A method for bridging a call placed by a caller to a telephone number of a called party, said call being bridged to a return call originated by said called party in response to being transmitted a message of said call, the method comprising the steps of:
determining based on caller identity information associated with the caller whether an alphanumeric identifier exists in a database;
transmitting a message to said called party containing said alphanumeric identifier if said identifier exists in said database for said caller;
if no alphanumeric identifier exists n said database for said caller,
determining based on the caller identity information whether said caller had previously called said called party by querying said database,
transmitting a message to said called party that a repeat caller is calling, and
enabling said called party to enter an alphanumeric identifier in said database for said caller;
prompting said caller to provide an audible identifier;
detecting characteristic features of a response audible identifier, wherein said caller identity information corresponds to said detected characteristic features;
identifying caller identity information in the database for previous callers with no associated alphanumeric identifier having a characteristic feature substantially within a threshold limit of the detected characteristic feature of the caller's audible identifier;
if caller identity information is identified,
transmitting a message to said called party that a possible repeat caller is calling;
enabling the called party to listen to said audio identifiers of the caller and of said previous caller associated with the identified caller identity information;
prompting the called party to determine if the caller and the previous caller are the same person; and
if the called party responds that he caller and the previous caller are the same party, enabling the called party to enter said alphanumeric identifier in the database.

31. The method of claim 30 further comprising storing the caller identity information associated with said response audible identifier, wherein the alphanumeric identifier is associated with the identified caller identity information as well as said caller identity information associated with said response audible identifier.

32. The method of claim 30 further comprising transmitting said audible identifier of said caller to the database.

* * * * *